(12) United States Patent
Okawara et al.

(10) Patent No.: US 8,124,236 B2
(45) Date of Patent: Feb. 28, 2012

(54) GAS-BARRIER LAMINATE FOR HYDROTHERMAL TREATMENT

(75) Inventors: Chiharu Okawara, Ibaraki-ken (JP); Shigenobu Yoshida, Ibaraki-ken (JP); Tooru Hachisuka, Ibaraki-ken (JP)

(73) Assignee: Mitsubishi Plastics, Inc., Tokyo (JP)

( * ) Notice: Subject to any disclaimer, the term of this patent is extended or adjusted under 35 U.S.C. 154(b) by 572 days.

(21) Appl. No.: 11/996,107

(22) PCT Filed: Jul. 12, 2006

(86) PCT No.: PCT/JP2006/313836
§ 371 (c)(1), (2), (4) Date: Apr. 9, 2009

(87) PCT Pub. No.: WO2007/013303
PCT Pub. Date: Feb. 1, 2007

(65) Prior Publication Data
US 2010/0035050 A1    Feb. 11, 2010

(30) Foreign Application Priority Data
Jul. 27, 2005    (JP) ................................ 2005-216988

(51) Int. Cl.
*B32B 27/40* (2006.01)
(52) U.S. Cl. ..................... 428/425.5; 428/448; 428/451; 428/702
(58) Field of Classification Search ............... 428/423.1, 428/425.5, 448, 451, 702; 528/44
See application file for complete search history.

(56) References Cited

U.S. PATENT DOCUMENTS

| | | | | |
|---|---|---|---|---|
| 5,393,592 | A | * | 2/1995 | Jenne ............................. 428/213 |
| 7,495,058 | B2 | * | 2/2009 | Kitada et al. .................. 525/453 |

FOREIGN PATENT DOCUMENTS

| | | |
|---|---|---|
| JP | 55-084332 | 6/1980 |
| JP | 02-299826 | 12/1990 |
| JP | 03-016728 | 1/1991 |
| JP | 8-197674 | 8/1996 |
| JP | 08-300549 | 11/1996 |
| JP | 11-179836 | 7/1999 |
| JP | 2000-062074 | 2/2000 |
| JP | 2003-305798 A | 10/2003 |
| JP | 2004-025768 | 1/2004 |
| JP | 2004025768 A * | 1/2004 |

OTHER PUBLICATIONS

U.S. Appl. No. 12/992,378, filed Nov. 16, 2010, Yoshida, et al.
Database WPI Week 200420 Thomson Scientific, London, GB; AN2004-206760 XP002509353, Oct. 28, 2003.
U.S. Appl. No. 13/022,283, filed Feb. 7, 2011, Yoshida, et al.
U.S. Appl. No. 13/201,543, filed Sep. 16, 2011, Yoshida, et al.

* cited by examiner

*Primary Examiner* — Thao T. Tran
(74) *Attorney, Agent, or Firm* — Oblon, Spivak, McClelland, Maier & Neustadt, L.L.P.

(57) ABSTRACT

The present invention relates to a gas-barrier laminate for hydrothermal treatment which comprises a base plastic film, a coating layer formed on at least one surface of the base plastic film, an inorganic thin film formed on a surface of the coating layer which is made of a metal compound, and a heat-sealable plastic film laminated on the inorganic thin film or the base plastic film, wherein the inorganic thin film before laminating the heat-sealable plastic film thereon has a rubbing strength of not less than 20 times as measured under a load of 70 g, and the coating layer has a hardness of 0.15 to 0.40 GPa. The laminate of the present invention is excellent in interlaminar bonding property, hardly undergoes breakage of the inorganic thin film owing to the hydrothermal treatment, and can maintain an excellent gas-barrier property even after subjected to the hydrothermal treatment.

10 Claims, No Drawings

GAS-BARRIER LAMINATE FOR HYDROTHERMAL TREATMENT

CROSS REFERENCE TO PRIOR APPLICATIONS

This is a U.S. national phase application under 35 U.S.C. §371 of International Patent Application No. PCT/JP2006/313836, filed Jul. 12, 2006, which claims the benefit of Japanese Application No. 2005-216988, filed Jul. 27, 2005, both of which are incorporated by reference herein. The International Application was published in Japanese on Feb. 1, 2007 as International Publication No. WO 2007/013303 Al under PCT Article 21(2).

TECHNICAL FIELD

The present invention relates to a gas-barrier laminate for hydrothermal treatment, and more particularly to a gas-barrier laminate for hydrothermal treatment suitably used for packaging foods, medicines, etc., which can maintain an excellent gas-barrier property even after being subjected to hydrothermal treatment (such as retort treatment and sterilization treatment).

BACKGROUND ART

Hitherto, as packaging materials to be sterilized by hydrothermal treatment, there have been frequently used laminates prepared by bonding an aluminum foil and a film with each other, and deposited films prepared by vapor-depositing aluminum on a surface of the film. However, since such packaging materials are opaque due to aluminum used therein, there is caused such a problem that resultant packages filled with contents are no longer subjected to inspections for metal foreign materials in the contents and appearance of the contents.

Consequently, in recent years, there have been proposed many gas-barrier films having a high transparency which are prepared by forming an inorganic thin film made of silicon oxide, aluminum oxide or magnesium oxide which has a thickness of 10 to 100 nm, on the surface of a base plastic film. These gas-barrier films are usually in the form of a laminate further including a separate plastic film layer laminated on the inorganic thin film, and are used as packaging materials for foods, medicines or the like.

It has been expected that the above gas-barrier laminates are used as retort packaging materials. However, in such application fields, the packaging materials have been required to still maintain the gas-barrier property even after being subjected to hydrothermal treatment. However, the inorganic thin film formed in the above laminates tends to be readily broken upon the hydrothermal treatment, resulting in remarkable deterioration in gas-barrier property thereof. It is considered that the problem is caused by change in volume of the base plastic film due to shrinkage thereof when subjected to hydrothermal treatment, or oxidation of the inorganic thin film. The gas-barrier property of the laminates may be maintained by increasing the thickness of the inorganic thin film, for example, up to about 100 nm or more. In this case, however, the productivity of the laminates tends to be deteriorated, resulting in increased production costs. Further, there may arise problems such as poor transparency of the obtained laminates.

To solve the above problems, there have been proposed the method of subjecting a deposited film including an inorganic thin film to heat treatment as a post treatment thereof for a short period of time, e.g., for a period of from about several seconds to about one minute in order to enhance an adhesion between the inorganic thin film and the other plastic film layer (for example, refer to Japanese Patent Application Laid-open (KOKAI) No. 55-84332(1980)), and the method of forcibly irradiating a deposited film with a visible light for a long period of time to enhance a transparency of the film and stabilize a gas-barrier property thereof (for example, refer to Japanese Patent Application Laid-open (KOKAI) No. 8-197674(1996)). However, these conventional methods have failed to attain the effect of improving a gas-barrier property of the gas-barrier films having the inorganic thin film after subjecting these films to the hydrothermal treatment.

In addition, there have been proposed the method of subjecting a deposited film to water or moisture absorption treatment and then to heat treatment in order to maintain a transparency of the film and improve a gas-barrier property thereof (for example, refer to Japanese Patent Application Laid-open (KOKAI) No. 2-299826(1990)), and the method of heat-treating a laminated film produced by laminating the other film on an inorganic thin film formed on a biaxially stretched film through an adhesive resin layer for a short period of time at a temperature of from a second-order transition point to a melting point of the biaxially stretched film, more specifically at about 200° C. at which the adhesive resin layer can be melted, while preventing heat shrinkage of the film, in order to improve a gas-barrier property of the laminated film (for example, refer to Japanese Patent Application Laid-open (KOKAI) No. 8-300549(1996)). Although the films obtained in these conventional methods are improved in gas-barrier property, when a laminate using the deposited films is used as a retort packaging material, a gas-barrier property thereof after subjected to the hydrothermal treatment tends to be still insufficient.

Further, it is known that a deposited polyester film having a polyester-based anchor coat layer which undergoes heat history at not lower than the glass transition temperature during the production process of the deposited polyester film, can exhibit a good adhesion between the based polyester film and the deposited layer even when the deposited polyester film is subjected to hydrothermal treatment (for example, refer to Japanese Patent Application Laid-open (KOKAI) No. 3-16728(1991)). However, the heat history imparted to the film in the above method is only a general heat treatment conducted upon ordinary vapor deposition steps or film-stretching/heat-treating steps during the production process of deposited films.

DISCLOSURE OF THE INVENTION

Problem to be Solved by the Invention

The present invention has been made in view of the above conventional problems. An object of the present invention is to provide a gas-barrier laminate for hydrothermal treatment which is excellent in interlaminar bonding property, hardly undergoes breakage of an inorganic thin film formed therein due to the hydrothermal treatment, and can maintain an excellent gas-barrier property even after subjected to the hydrothermal treatment.

Means for Solving the Problem

As a result of the present inventors' earnest study, it has been found that the above conventional problems can be solved by forming a coating layer having a specific composition between the base plastic film and the inorganic thin film. The present invention has been attained on the basis of the above finding.

In an aspect of the present invention, there is provided a gas-barrier laminate for hydrothermal treatment, comprising a base plastic film, a coating layer formed on at least one surface of the base plastic film, an inorganic thin film formed on a surface of the coating layer which is made of a metal compound, and a heat-sealable plastic film laminated on the inorganic thin film or the base plastic film, wherein the inorganic thin film before laminating the heat-sealable plastic film thereon has a rubbing strength of not less than 20 times as measured under a load of 70 g, and the coating layer has a hardness of 0.15 to 0.40 GPa.

Effect of the Invention

The gas-barrier laminate for hydrothermal treatment according to the present invention is excellent in interlaminar bonding property and can maintain an excellent gas-barrier property even after subjected to the hydrothermal treatment.

BEST MODE FOR CARRYING OUT THE INVENTION

The present invention is described in detail below. However, the following descriptions are concerned only with typical examples of the preferred embodiments of the present invention, and therefore not intended to limit the scope of the present invention thereto. The gas-barrier film (laminate) of the present invention includes a base plastic film, a coating layer formed on at least one surface of the base plastic film, an inorganic thin film vapor-deposited on a surface of the coating layer which is made of a metal compound, and a heat-sealable plastic film laminated on the inorganic thin film.

As the base plastic film, any suitable plastic films may be used without particular limitations as long as they are applicable to ordinary packaging materials. Specific examples of the base plastic film include films made of various raw materials including polyolefins such as homopolymers and copolymers of ethylene, propylene, butene, etc.; amorphous polyolefins such as cyclic polyolefins; polyesters such as polyethylene terephthalate and polyethylene-2,6-naphthalate; polyamides such as nylon 6, nylon 66, nylon 12 and copolymerized nylon; partially hydrolyzed products of ethylene-vinyl acetate copolymer (EVOH); polyimides; polyether imides; polysulfones; polyether sulfones; polyether ether ketones; polycarbonates (PC); polyvinyl butyral; polyarylates; fluororesins; acrylate resins; and biodegradable plastic films. Of these plastic materials, preferred are polyesters, polyamides, polyolefins and partially hydrolyzed products of ethylene-vinyl acetate copolymer, and more preferred are polyesters and polyamides.

The base plastic film may be produced by conventionally known ordinary methods. Although the base plastic film may be in the form of either an unstretched film or a stretched film, the stretched film is preferably used. Also, the base plastic film may be in the form of a laminated film prepared by laminating a plurality of resin films with each other. The thickness of the base plastic film may be appropriately selected from the range of usually 5 to 500 μm and preferably 10 to 200 μm according to properties required as a base material of the laminate of the present invention when used in various applications, such as mechanical strength, flexibility and transparency. In addition, the width and length of the base plastic film are not particularly limited, and may be appropriately selected according to the applications thereof.

The base plastic film may also contain particles added for forming projections on the surface of the film, crystallized particles as well as other catalyst residues in such amounts as ordinarily used by those skilled in the art according to the applications thereof. Further, the base plastic film may also contain additives other than the above projection-forming agents such as antistatic agents, stabilizers, lubricants, crosslinking agents, anti-blocking agents, antioxidants, colorants, light beam-shielding agents and ultraviolet light absorbers, if required.

The base plastic film may be in the form of a film made of regenerated materials, and such a film can be used in the present invention without any significant problems. For example, regenerated polyesters obtained by processing scraps of a polyester film which are generated in the course of the production process of polyester film products into chips may be used as the raw material of the base plastic film from the viewpoint of saving of resources. The amount of the regenerated polyesters used is not particularly limited, and is usually 10 to 100% by weight on the basis of the whole raw polyesters.

A coating material for forming the coating layer of the present invention may be in the form of either a solvent-based material or a water-based or aqueous material as long as it satisfies the above properties as required according to the present invention. Among these materials, the water-based or aqueous coating material is preferred from the viewpoints of good environmental suitability and good in-line coatability. In particular, the coating material for forming the coating layer preferably contains, as resin components thereof, an aqueous resin having at least one group selected from the group consisting of an oxazoline group, a melamine group, an epoxy group, an isocyanate group and a carbodiimide group, and an aqueous polyurethane-based resin.

Examples of the above oxazoline group-containing aqueous resin include polymers obtained by polymerizing (a) an addition-polymerizable oxazoline represented by any of the following formulae (I) to (III) and optionally (b) at least one other monomer.

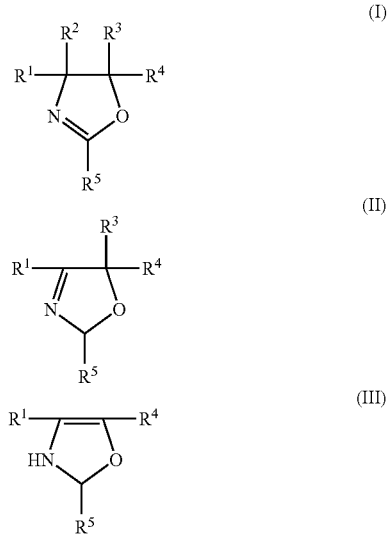

The above polymers may be dissolved in a mixed solvent of water and a water-soluble organic solvent upon use. Also, the polymers usually contain no emulsifier and, therefore, can exhibit sufficient effects of water resistance and solvent resistance due to crosslinking of the oxazoline group.

In the above formulae (I) to (III), $R^1$, $R^2$, $R^3$ and $R^4$ are each independently a hydrogen atom, a halogen atom, an alkyl group, an aralkyl group, a phenyl group or a substituted phenyl group; and $R^5$ is a non-cyclic organic group having an addition-polymerizable unsaturated bond.

Examples of the halogen atom usually include fluorine, chlorine, bromine and iodine. Among these halogen atoms, preferred are chlorine and bromine. Examples of the above alkyl group include methyl, ethyl, n-propyl, isopropyl, n-butyl, isobutyl, pentyl and hexyl. Examples of the above aralkyl group include those aralkyl groups containing an alkyl chain having 1 to 5 carbon atoms. Specific examples of the aralkyl groups include benzyl, phenethyl, benzhydryl and naphthylmethyl. Examples of the above substituted phenyl group include chlorophenyl, bromophenyl, methoxyphenyl, ethoxyphenyl, methylaminophenyl, ethylaminophenyl, dimethylaminophenyl, methylethylaminophenyl and diethylaminophenyl. Examples of the above non-cyclic organic group having an addition-polymerizable unsaturated bond include vinyl and isopropenyl.

Examples of the above addition-polymerizable oxazoline (a) include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. Theses addition-polymerizable oxazolines (a) may be used in combination of any two or more thereof. Among these addition-polymerizable oxazolines, 2-isopropenyl-2-oxazoline is more suitably used in view of good industrial availability.

The above monomer (b) is not particularly limited as long as the monomer is copolymerizable with the addition-polymerizable oxazoline (a). Examples of the monomer (b) include methacrylic acid esters such as methyl methacrylate, butyl methacrylate and 2-ethylhexyl methacrylate; unsaturated carboxylic acids such as methacrylic acid, itaconic acid and maleic acid; unsaturated nitriles such as methacrylonitrile; unsaturated amides such as methacrylamide and N-methylolated methacrylamide; vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene. These monomers (b) may be used in combination of any two or more thereof.

The oxazoline group-containing aqueous resin may be produced, for example, by the method of dissolving the addition-polymerizable oxazoline (a) and optionally the at least one monomer (b) as well as a polymerization initiator such as benzoyl peroxide and azobisisobutyronitrile in a water-soluble organic solvent and then heating the resultant solution. Further, a water-soluble coating material containing the oxazoline group-containing aqueous resin may be obtained by adding water to the resultant polymer solution and then subjecting the solution to distillation under heating to remove a part or whole of the solvent. Alternatively, the aqueous resin may also be produced by an anion polymerization method using n-butyl lithium, etc., as a catalyst. The content of the oxazoline group in the oxazoline group-containing aqueous resin is usually 0.4 to 5.0 mmol/g and preferably 0.5 to 4.0 mmol/g.

Examples of the above epoxy group-containing aqueous resin include bisphenol-epichlorohydrin type epoxy resins, cyclic aliphatic epoxy resins, novolak type epoxy resins, epoxy olefin resins, polyol-glycidyl type epoxy resins, epoxidated soybean oils and silane epoxy resins. Meanwhile, among these epoxy group-containing aqueous resins, those resins incapable of being dissolved or dispersed in water by themselves may be forcibly emulsified in water by using an emulsifier. In particular, among these resins, preferred are epoxy resins which are soluble in water or water-soluble type organic solvents, such as polyethylene glycol diglycidyl ether, polypropylene glycol diglycidyl ether, neopentyl glycol diglycidyl ether, 1,6-hexane glycol diglycidyl ether, glycerol polyglycidyl ether, trimethylol propane polyglycidyl ether, sorbitol polyglycidyl ether and bisphenol A diglycidyl ether.

Examples of the above melamine group-containing aqueous resin include etherified compounds produced by reacting a methylol melamine derivative obtained by condensation between melamine and formaldehyde with a lower alcohol such as methyl alcohol, ethyl alcohol and isopropyl alcohol, as well as mixtures thereof. Examples of the methylol melamine derivative include monomethylol melamine, dimethylol melamine, trimethylol melamine, tetramethylol melamine, pentamethylol melamine and hexamethylol melamine. Among these methylol melamine derivatives, especially preferred are water-soluble melamines because they are readily miscible with the other resins and allowed to be present in a uniform state upon forming a coating film thereof, and further can exhibit a good followability upon stretching. In addition, there may also be used methylated melamine resins obtained by alkyl-etherifying melamine with methanol, mixed etherified melamine resins obtained by alkyl-etherifying melamine with 2 or more kinds of alcohols, etc.

Examples of the above isocyanate group-containing aqueous resin include polyisocyanate compounds such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3-dimethyl-4,4'-dicyclohexylmethane diisocyanate and tetramethylxylene diisocyanate, and isocyanate end group-containing prepolymers obtained by reacting these compounds with an isocyanurate-type or buret-type trifunctional polyisocyanate or a di- or more functional polyol compound.

The above carbodiimide group-containing aqueous resin is a generic name of resins containing at least two carbodiimide groups per one molecule thereof, and is produced by subjecting a diisocyanate compound to polycondensation in the presence of a catalyst. The carbodiimide group-containing aqueous resin may be produced by known methods, for example, the methods described in Japanese Patent Publication (KOKOKU) No. 47-33279(1972), Japanese Patent Application Laid-open (KOKAI) No. 9-235508(1997), etc. Examples of the diisocyanate compound as a starting material of the carbodiimide group-containing aqueous resin include aromatic, aliphatic and alicyclic diisocyanates. Specific examples of the diisocyanate compound include tolylene diisocyanate, xylene diisocyanate, diphenylmethane diisocyanate, hexamethylene diisocyanate, cyclohexane diisocyanate, isophorone diisocyanate and dicyclohexyl diisocyanate. The carbodiimide group-containing aqueous resin may also optionally contain surfactants, polyalkylene oxides, or hydrophilic monomers such as quaternary ammonium salts such as dialkyl amino alcohols and hydroxyalkylsulfonic acid salts, unless the addition of these compounds adversely affects the effects of the present invention, in order to enhance a water solubility and/or a water dispersibility of the resin. The amount of these compounds added is usually about 1 to about 10 parts by weight on the basis of 100 parts by weight of the water-soluble carbodiimide group-containing aqueous resin and/or the water-dispersible carbodiimide group-containing aqueous resin.

The amount of the crosslinking aqueous resin blended as the resin component forming the coating layer is 10 to 60% by weight and preferably 20 to 50% by weight in terms of a solid content thereof. When the amount of the crosslinking aqueous resin blended is less than 10% by weight, the resultant film tends to be deteriorated in interlaminar bonding property owing to insufficient interlaminar crosslinked structure formed by the crosslinking group. When the amount of the crosslinking aqueous resin blended is more than 60% by weight, the resultant film tends to suffer from blocking. In the present invention, as the crosslinking group-containing aqueous resin, there is preferably used the aqueous resin containing an oxazoline group from the viewpoints of facilitated coating operation and good stability upon storage after the coating.

The aqueous polyurethane-based resin contained in the coating material for forming the coating layer of the present invention may be produced by reacting a polyhydroxy compound (also referred to as a polyol compound) with a polyisocyanate compound. Examples of the polyhydroxy compound include polyester polyols, polycarbonate polyols and polyoxypolyalkylene polyols which are ordinarily used as polyols. Specific examples of the polyester polyols include those polyester polyols produced by reacting at least one low-molecular weight diol selected from ethylene glycol, diethylene glycol, triethylene glycol, 1,2-propylene glycol, 1,3-butylene glycol, 1,5-pentanediol, 1,4-butylene glycol, 1,6-hexanediol, dipropylene glycol, tripropylene glycol, neopentyl glycol, cyclohexanediol and cyclohexane dimethanol, with a polycarboxylic acid such as malonic acid, maleic acid, succinic acid, adipic acid, azelaic acid, tartaric acid, pimelic acid, sebacic acid, oxalic acid, terephthalic acid, isophthalic acid, maleic acid, maleic anhydride, fumaric acid, dimer acid and trimellitic acid, or a derivative of these acids; and those polyester polyols produced by ring opening polymerization of ε-caprolactam, etc.

Examples of the polycarbonate polyols include those compounds produced by reacting at least one diol selected from ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, 1,4-cyclohexane dimethanol and bisphenol A, with a carbonate such as dimethyl carbonate, diphenyl carbonate, ethylene carbonate and phosgene.

Examples of the polyoxypolyalkylene polyols include those compounds produced by subjecting a cyclic ether such as oxetane, tetrahydrofuran and tetrahydropyran to ring opening addition polymerization using, as an initiator, a low-molecular weight diol such as ethylene glycol, diethylene glycol, triethylene glycol, 1,2-propylene glycol, 1,3-butylene glycol, 1,5-pentanediol, 1,4-butylene glycol, 1,6-hexanediol, dipropylene glycol, tripropylene glycol and neopentyl glycol. Among these compounds, preferred are polyoxypolyalkylene polyols containing an alkylene group having 3 to 7 carbon atoms, and more preferred are polyoxypolyalkylene polyols containing an alkylene group having 4 to 6 carbon atoms.

The above polyisocyanate compound is not particularly limited as long as the compound is ordinarily usable for production of polyurethane resins. Examples of the polyisocyanate compound include aromatic diisocyanates, aromatic aliphatic diisocyanates, aliphatic diisocyanates, alicyclic diisocyanates and derivatives or modified products of these diisocyanates.

Specific examples of the aromatic diisocyanates include m-phenylene diisocyanate, p-phenylene diisocyanate, 4,4'-diphenylene diisocyanate, 1,5-naphthalene diisocyanate, 4,4'-diphenylmethane diisocyanate, 2,4- or 2,6-tolylene diisocyanate, 4,4'-toluidine diisocyanate and 4,4'-diphenyl ether diisocyanate.

Specific examples of the aromatic aliphatic diisocyanates include 1,3- or 1,4-xylylene diisocyanate and a mixture thereof.

Specific examples of the aliphatic diisocyanates include trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethyl hexamethylene diisocyanate and 2,6-diisocyanatomethyl caproate.

Specific examples of the alicyclic diisocyanates include 1,3-cyclopentane diisocyanate, 1,4-cyclohexane diisocyanate, 1,3-cyclohexane diisocyanate, 3-isocyanatomethyl-3,5,5-trimethylcyclohexyl isocyanate (isophorone diisocyanate), 4,4'-methylenebis(cyclohexyl isocyanate), methyl-2,4-cyclohexane diisocyanate, methyl-2,6-cyclohexane diisocyanate, 1,4-bis(isocyanatomethyl)cyclohexane, 1,3-bis(isocyanatomethyl)cyclohexane and 2,5(2,6)-bis(isocyanatomethyl)bicyclo[2.2.1]heptane.

Specific examples of the derivatives of the polyisocyanates include dimers, trimers, buret compounds, allophanates, carbodiimides, ureidodiones and oxadiazidinetriones of the above polyisocyanates, polymethylene polyphenyl polyisocyanates (crude MDI, polymeric MDI), and crude TDI.

Specific examples of the modified products of the polyisocyanates include modified polyols produced by reacting the above polyisocyanate or derivative thereof with a polyol in such an equivalent ratio that an isocyanate group contained in the polyisocyanate is present in an excessive amount as compared to a hydroxyl group contained in the polyol. These polyisocyanates may be used alone or in combination of any two or more thereof.

The aqueous polyurethanes are polyurethanes obtained by introducing a group capable of enhancing an affinity to water, e.g., an anionic functional group such as a carboxylic acid salt group, a sulfonic acid salt group and a sulfuric acid half-ester salt group, and a cationic functional group such as a quaternary ammonium salt group, into ordinary polyurethane resins. Among these functional groups, in view of good dispersibility in water and easiness of controlling the reaction upon synthesis of the polyurethanes, preferred are the anionic functional groups, and more preferred are the carboxylic acid salt group and the sulfonic acid salt group.

The above carboxylic acid salt group may be introduced into the polyurethane resins, for example, by the method of using a carboxyl group-containing polyhydroxy compound as one of raw polyhydroxy compounds upon synthesis of the polyurethanes, the method of reacting an isocyanate group of an unreacted isocyanate group-containing polyurethane with a hydroxyl group-containing carboxylic acid or an amino group-containing carboxylic acid and then neutralizing the obtained reaction product by adding the product to an alkali aqueous solution under stirring at a high speed, etc.

The sulfonic acid salt group or the sulfuric acid half-ester salt group may be usually introduced into the polyurethane resins by the method of reacting a polyhydroxy compound, a polyisocyanate and a chain extender with each other to produce a prepolymer, and adding to the prepolymer, a compound containing an amino group or a hydroxyl group and a sulfonic acid salt group or a sulfuric acid half-ester salt group which are capable of reacting with an isocyanate end group of the prepolymer in a molecule thereof to conduct the reaction therebetween, thereby finally obtaining the aqueous polyurethane containing the sulfonic acid salt group or the sulfuric acid half-ester salt group in a molecule thereof. In this case, it is preferred that the synthesis reaction is conducted in an organic solvent, and then water is added to the reaction solution, followed by removing water therefrom. As an alternative method for introducing the sulfonic acid salt group or the sulfuric acid half-ester salt group into the polyurethane resins, there may be used, for example, the method of synthesizing a sulfonic acid group-containing polyurethane by using a sulfonic acid group-containing compound as one of raw materials therefor and then neutralizing the obtained sulfonic acid group-containing polyurethane by adding the polyurethane to an alkali aqueous solution under stirring at a high speed, the method of adding the below-mentioned sultone compound to a primary or secondary amino group in a main chain or a side chain of a polyurethane to introduce a sulfonic acid alkali salt (for example, —SO$_3$Na, etc.) into the polyurethanes.

Examples of the alkali aqueous solution include aqueous solutions of sodium hydroxide, potassium hydroxide, ammonia and alkyl amines. Among these alkalis, preferred are ammonia that does not remain in the resultant coating layer, and the amines that can be volatilized under drying conditions. The amount of the salt group introduced into the polyurethane such as the carboxylic acid salt group, sulfonic acid salt group and sulfuric acid half-ester salt group is usually $0.5 \times 10^{-4}$ to $20 \times 10^{-4}$ equivalent/g and preferably $1 \times 10^{-4}$ to $10 \times 10^{-4}$ equivalent/g. When the amount of the salt group introduced is too small, the resultant polyurethane tends to exhibit an insufficient affinity to water, so that it may be difficult to prepare a coating solution thereof. When the amount of the salt group introduced is too large, the resultant polyurethane may fail to exhibit inherent properties thereof. The above aqueous polyurethane can form a stable water dispersion or an aqueous solution by using a dispersant, if required.

Examples of the carboxylic acid-containing polyols include dimethylol propionic acid, dimethylol butyric acid, dimethylol valeric acid and trimellitic acid bis(ethylene glycol) ester. Examples of the amino group-containing carboxylic acids include β-aminopropionic acid, γ-aminobutyric acid and p-aminobenzoic acid. Examples of the hydroxyl group-containing carboxylic acids include 3-hydroxypropionic acid, γ-hydroxybutyric acid, p-(2-hydroxyethyl)benzoic acid and malic acid.

Examples of the compounds containing an amino or hydroxyl group and a sulfone group include aminoemthanesulfonic acid, 2-aminoethanesulfonic acid, 2-amino-5-methylbenzene-2-sulfonic acid, sodium β-hydroxyethanesulfonate, and addition products of propane sultone or butane sultone with an aliphatic di-primary amine compound. Among these compounds, preferred are the addition products of propane sultone with an aliphatic di-primary amine compound. Examples of the compounds containing an amino or hydroxyl group and a sulfuric half-ester group include aminoethanol sulfuric acid, ethylenediamineethanol sulfuric acid, aminobutanol sulfuric acid, hydroxyethanol sulfuric acid, γ-hydroxypropanol sulfuric acid and α-hydroxybutanol sulfuric acid. The synthesis of the polyurethanes using these compounds may be performed by the conventionally known methods.

The coating solution for forming the coating layer may also contain a small amount of the other crosslinking agent such as, for example, methylolated or alkylolated urea-based, guanamine-based, acrylamide-based and polyamide-based compounds, aziridine compounds, silane coupling agents, titanium coupling agents, zirco-aluminate coupling agents, peroxides, photoreactive vinyl compounds or photosensitive resins, in order to improve fixing property (blocking property), water resistance, solvent resistance and mechanical strength of the coating layer, unless the addition thereof adversely affects a bonding property of the resultant coating layer. When using an epoxy compound such as glycidyl acrylate and glycidyl methacrylate in combination with the other components in the coating solution, the epoxy compound is crosslinked with a carboxyl group, etc., in a side chain of the resin compound, thereby suitably enhancing adhesion to the vapor-deposited film.

Among the above aqueous polyurethane-based resins, preferred are aqueous polyester-based polyurethane resins (in particular, those having an elongation of 50 to 600) or aqueous polycarbonate-based polyurethane resins which are obtained by reacting a polyester polyol or a polycarbonate polyol with a polyisocyanate.

The amount of the aqueous polyurethane-based resin blended which forms the coating layer is 10 to 70% by weight and preferably 20 to 50% by weight. When the amount of the aqueous polyurethane-based resin blended is less than 10% by weight, the barrier layer tends to be peeled off together with the coating layer. When the amount of the aqueous polyurethane-based resin blended is more than 70% by weight, the resultant film tends to be deteriorated in water resistance.

In the coating layer, the aqueous resin containing at least one group selected from the group consisting of an oxazoline group, a melamine group, an epoxy group, an isocyanate group and a carbodiimide group, and the aqueous polyurethane-based resin, are preferably used in combination with an aqueous acrylic resin. When using the aqueous acrylic resin in combination with the aqueous resin and the aqueous polyurethane-based resin, the resultant film can be prevented from undergoing deterioration in hot water resistance and solvent resistance. The reason therefor is considered to be that the acrylic resin film has the effect of preventing crystallization of oligomers on the surface of the base plastic film such as a polyethylene terephthalate film, and owing to such an effect of preventing crystallization of oligomers, the adhesion between the base plastic film and the coating layer can be enhanced.

The aqueous acrylic resin is such a resin containing an alkyl acrylate and/or an alkyl methacrylate as a main component. More specifically, the aqueous acrylic resin is a water-soluble or water-dispersible resin in which the content of the alkyl acrylate component and/or alkyl methacrylate component is usually 40 to 95 mol %, and the content of a vinyl monomer component containing a functional group which is copolymerizable with the alkyl acrylate component and/or alkyl methacrylate component is usually 5 to 60 mol %. In particular, the water-soluble resin is preferably used from the viewpoint of a good water resistance.

Examples of the functional group contained in the vinyl monomer component include a carboxyl group, an acid anhydride group, a sulfonic acid group and salts thereof; an amido group and alkylolated amido groups; an amino group (including substituted amino groups), alkylolated amino groups and salts thereof; a hydroxyl group; and an epoxy group. Among these functional groups, preferred are a carboxyl group, an acid anhydride group, an epoxy group, etc. These functional groups may be contained in combination of any two or more thereof in the resin.

When the above aqueous acrylic resin contains the alkyl acrylate component and/or the alkyl methacrylate component in an amount of not less than 40 mol %, a coatability of the coating solution and a strength and an anti-blocking property of the obtained coating film can be especially enhanced. Further, when the content of the alkyl acrylate component and/or the alkyl methacrylate component in the aqueous acrylic resin is controlled to not more than 95 mol % and the compound containing the specific functional group as the copolymerizable component is introduced into the aqueous acrylic resin in an amount of not less than 5 mol %, the resultant aqueous acrylic resin can be easily rendered water-soluble or water-dispersible, and can stably maintain the water-soluble or water-dispersible condition for a long period of time. As a result, the bonding property between the coating layer and the base film layer can be enhanced, and the resultant coating layer can be improved in strength, water resistance and chemical resistance owing to the reaction within the coating layer.

Examples of the alkyl group contained in the alkyl acrylate and alkyl methacrylate include methyl, n-propyl, isopropyl, n-butyl, isobutyl, 2-ethylhexyl, lauryl, stearyl and cyclohexyl. Examples of the compound containing a carboxyl group or an acid anhydride group include acrylic acid, methacrylic acid, itaconic acid, maleic acid, and alkali metal salts, alkali earth metal salts and ammonium salts of these acids, as well as maleic anhydride. Examples of the compound containing a sulfonic acid group or salts thereof include vinylsulfonic acid, styrenesulfonic acid, metal salts of these sulfonic acids such as sodium salts thereof, and ammonium salts of these sulfonic acids.

Examples of the compound containing an amido group or an alkylolated amido group include acrylamide, methacrylamide, N-methyl methacrylamide, methylolated acrylamide, methylolated methacrylamide, ureidovinyl ether, β-ureidoisobutylvinyl ether and ureidoethyl acrylate.

Examples of the compound containing an amino group, an alkylolated amino group or a salt thereof include diethylaminoethyl vinyl ether, 2-aminoethyl vinyl ether, 3-aminopropyl vinyl ether, 2-aminobutyl vinyl ether, dimethylaminoethyl methacrylate, dimethylaminoethyl vinyl ether, methylolated compounds obtained by methiolating the amino group of these compounds, and quaternary compounds obtained by modifying these compounds with an alkyl halide, dimethylsulfuric acid, sultone, etc.

Examples of the compound containing a hydroxyl group include β-hydroxyethyl acrylate, β-hydroxyethyl methacrylate, β-hydroxypropyl acrylate, β-hydroxypropyl methacrylate, β-hydroxyvinyl ether, 5-hydroxypentyl vinyl ether, 6-hydroxyhexyl vinyl ether, polyethylene glycol monoacrylate, polyethylene glycol monomethacrylate, polypropylene glycol monoacrylate and polypropylene glycol monomethacrylate. Examples of the compound containing an epoxy group include glycidyl acrylate and glycidyl methacrylate.

Further, examples of the compound usable in combination as the copolymerizable component of the above aqueous acrylic resin include acrylonitrile, styrenes, butyl vinyl ether, maleic acid mono- or di-alkyl esters, fumaric acid mono- or di-alkyl esters, itaconic acid mono- or di-alkyl esters, methyl vinyl ketone, vinyl chloride, vinylidene chloride, vinyl acetate, vinyl pyridine, vinyl pyrrolidone and vinyl trimethoxysilane.

The above aqueous acrylic resin may be of any type, but is preferably of such a type containing no emulsifier. The reason therefor is that the above oxazoline group-containing aqueous resin is prevented from undergoing deterioration in water resistance, due to the absence of emulsifier.

Therefore, as the aqueous acrylic resin, there may be used aqueous acrylic resins of a self-dispersible type which is synthesized by using a reactive emulsifier or aqueous acrylic resins synthesized by using a high-molecular weight surfactant. The reason therefor is that the reacted emulsifier and the high-molecular weight surfactant cause no deterioration in water resistance of the above oxazoline group-containing aqueous resin.

The content of the aqueous acrylic resin in the coating layer is usually 10 to 70% by weight and preferably 20 to 50% by weight. When the content of the aqueous acrylic resin is less than 10% by weight, the obtained coating layer tends to fail to exhibit a sufficient water resistance and solvent resistance. When the content of the aqueous acrylic resin is more than 70% by weight, the obtained film tends to be deteriorated in interlaminar bonding property.

The coating layer of the present invention may also contain an aqueous polyester-based resin in addition to the aqueous resin containing at least one group selected from the group consisting of an oxazoline group, a melamine group, an epoxy group, an isocyanate group and a carbodiimide group, the aqueous polyurethane-based resin and the aqueous acrylic resin as an optional component. The aqueous polyester-based resin is not particularly limited, and there is preferably used any of water-soluble or water-dispersible saturated or unsaturated polyesters containing none of low-molecular hydrophilic dispersants, etc.

Examples of the dicarboxylic acid component of the saturated polyester include aromatic dicarboxylic acids such as terephthalic acid, isophthalic acid and 2,5-naphthalenedicarboxylic acid; aliphatic dicarboxylic acids such as adipic acid, azelaic acid and sebacic acid; oxycarboxylic acids such as oxybenzoic acid; and ester-forming derivatives of these acids. Examples of the glycol component of the saturated polyester include aliphatic glycols such as ethylene glycol, 1,4-butanediol, diethylene glycol and triethylene glycol; alicyclic glycols such as 1,4-cyclohexane dimethanol; aromatic diols such as p-xylenediol; and poly(oxyalkylene) glycols such as polyethylene glycol, polypropylene glycol and polytetramethylene glycol.

Although the above saturated polyesters have a linear structure, the polyesters may be in the form of a branched polyester obtained by using a tri- or more valent ester-forming component. On the other hand, examples of the above unsaturated polyester include the following polyesters (1) and (2).

(1) Unsaturated polyesters having a copolymerizable unsaturated group in a skeleton of the resin which is obtained by reacting a raw component containing the copolymerizable unsaturated group with the other raw component, for example, those polyesters described in Japanese Patent Publication (KOKOKU) Nos. 45-2201(1970), 46-2050(1971) and 44-7134(1969) and Japanese Patent Application Laid-open (KOKAI) Nos. 48-78233(1973) and 50-58123(1975).

(2) Unsaturated polyesters obtained by producing a saturated polyester containing no copolymerizable unsaturated group and then adding to the saturated polyester, a vinyl-based monomer containing a functional group that is reactive with a functional group contained in the saturated polyester such as a hydroxyl group and a carboxyl group, and a vinyl group, for example, those polyesters described in Japanese Patent Publication (KOKOKU) Nos. 49-47916(1974) and 50-6223(1975).

Examples of the vinyl-based monomer include compounds containing an epoxy group and a vinyl group such as glycidyl methacrylate; compounds containing an alkoxysilanol group and a vinyl group such as vinyl methoxysilane and methacryloxyethyl trimethoxysilane; compounds containing an acid anhydride group and a vinyl group such as maleic anhydride and tetrahydrophthalic anhydride; and compounds containing an isocyanate group and a vinyl group such as an addition product of 2-hydroxypropyl methacrylate with hexamethylene diisocyanate.

The aqueous polyester-based resin preferably contains a carboxyl group in order to enhance an affinity to an aqueous medium. The carboxyl group may be readily introduced into a side chain of the saturated or unsaturated polyester by the method of reacting a dioxane compound containing a carboxylic acid with the polyester (Japanese Patent Application Laid-open (KOKAI) No. 61-228030(1986)), the method of radically grafting an unsaturated carboxylic acid to the polyester (Japanese Patent Application Laid-open (KOKAI) No. 62-225510(1987)), the method of reacting the polyester with a halogenoacetic acid to introduce a substituent group into an aromatic ring of the polyester (Japanese Patent Application Laid-open (KOKAI) No. 62-225527(1987)), the method of reacting the polyester with a polycarboxylic anhydride compound (Japanese Patent Application Laid-open (KOKAI) No. 62-240318(1987)), etc.

The carboxyl group of the aqueous polyester-based resin may contain a counter ion. Examples of the counter ion include usually monovalent ions and preferably amine-based onium ions containing a hydrogen ion or an ammonium ion.

The aqueous polyester-based resin may be optionally blended in the coating layer. By blending the aqueous polyester-based resin, the resultant laminated film can be further enhanced in interlaminar bonding property, in particular, when using the polyester-based film, for example, a polyethylene terephthalate film, as the base plastic film.

The coating solution may also contain fine inorganic particles such as, for example, silica, silica sol, alumina, alumina sol, zirconium sol, kaolin, talc, calcium carbonate, titanium oxide, barium salts, carbon black, molybdenum sulfide, antimony oxide sol, etc., in order to improve a fixing property or a slipping property of the resultant coating layer. Further, the coating solution may also contain, if required, a defoaming agent, a coatability modifying agent, a thickening agent, an antistatic agent, an organic lubricant, organic polymer particles, an antioxidant, an ultraviolet light absorber, a foaming agent, dyes and pigments.

The coating solution may be applied onto the base plastic film using a coating apparatus such as a reverse roll coater, a gravure coater, a rod coater, an air doctor coater and other coaters as described in HARAZAKI, Yuji "Coating Method", Maki Shoten, 1979, during the film production process. The coating layer may be formed on a film after production of the film, and is preferably formed thereon during the film production process. When using a biaxially stretched film, it is preferred that after the coating solution is applied onto the film that is monoaxially stretched in a longitudinal direction thereof, the film in a dried or non-dried state is stretched in a lateral direction thereof and then subjected to heat treatment.

The above method is especially preferably employed because the film formation, coating and drying can be conducted at the same time, and large merits in view of production costs can be attained. The coating layer may be formed on one or both surfaces of the film. When the coating layer is formed on both surfaces of the film, the coating layers thus formed may be the same or different from each other. Meanwhile, in order to improve a coatability and a bonding property of the coating solution to the film, the surface of the film may be subjected to chemical treatment, discharge treatment, etc., before coating.

The hardness of the coating layer is 0.15 to 0.40 GPa and preferably 0.20 to 0.30 GPa. When the hardness of the coating layer is less than 0.15 GPa, the resultant laminated film tends to be deteriorated in blocking property. When the hardness of the coating layer is more than 0.40 GPa, the coating layer tends to fail to exhibit a good followability to deformation of the base plastic film and the inorganic thin film when subjected to hydrothermal treatment, so that the resultant laminated film tends to be deteriorated in barrier property after the hydrothermal treatment. The hardness of the coating layer may be controlled to the above-specified range by the method of appropriately selecting molecular weights and molecular weight distributions of various resins blended therein and properties thereof such as glass transition temperature, softening temperature, hardness and tensile strength as well as thickness of the coating layer, or by controlling the heat history after applying the coating solution onto the base plastic film. Upon selecting the resins as components of the coating layer for controlling the hardness thereof, in particular, suitable selection of the aqueous polyester-based polyurethane-based resin or the aqueous polycarbonate-based polyurethane-based resin is effective, and further it is more effective to use the aqueous polyester-based polyurethane-based resin having an elongation of 50 to 600. The elongation used herein means a breaking elongation (%) as measured by a tensile test according to JIS K7113. The specific measuring method of the hardness of the coating layer is explained hereinlater in Examples.

The surface roughness of the coating layer before forming the inorganic thin film thereon is usually not less than 1.5 nm, preferably not less than 3 nm and more preferably not less than 5 nm. It is considered that the surface shape (surface roughness or specific surface area) of the coating layer has influences on followability or adhesion of the coating layer to the inorganic thin film when the inorganic thin film undergoes deformation upon the hydrothermal treatment. When the surface roughness of the coating layer is less than 1.5 nm, the interlaminar bonding property between the coating layer and the inorganic thin film tends to be insufficient upon the hydrothermal treatment. The upper limit of the surface roughness of the coating layer is usually 30 nm. The surface roughness of the coating layer may be controlled to the above-specified range, for example, by the method of suitably selecting the components to be blended in the coating layer, in particular, selecting respective kinds or blending ratios of the aqueous urethane-based resin and the aqueous acrylic resin, or by varying the thickness of the coating layer. In addition, when the coating solution is applied onto the film monoaxially stretched in a longitudinal direction thereof and then the film is stretched in a lateral direction thereof in a dried or non-dried state, the surface roughness of the coating layer may be controlled by adjusting the drying or stretching conditions after the coating.

The coating layer preferably has a suitable softening temperature. The softening temperature of the coating layer is usually 5.0 to 120° C. and preferably 60 to 100° C. When the softening temperature of the coating layer lies within the above-specified range, there can be attained the effect of further enhancing adhesion between the respective layers upon the hydrothermal treatment. In order to control the softening temperature of the coating layer to the above-specified range, since the resins contained in the coating layer have respective inherent softening temperatures, there may be used the method of appropriately selecting kinds or blending ratios of the respective resins to be blended in the coating layer, or the method of conducting a crosslinking reaction between the resins not completely but incompletely for allowing a part of the resins to remain in a non-crosslinked state in the coating layer.

The thickness of the coating layer is usually 0.01 to 5 μm and preferably 0.02 to 1 μm. When the thickness of the coating layer is less than 0.01 μm, the resultant coating layer may fail to form a uniform resin layer. When the thickness of the coating layer is more than 5 μm, the resultant laminate tends to be deteriorated in slipping property, resulting in poor handling property thereof.

In the laminate of the present invention, the inorganic thin film is formed on the surface of the coating layer and made of a metal compound as a raw material. Examples of the metal compound include oxides, carbides and nitrides of silicon, aluminum, magnesium, zinc, tin, nickel and titanium, and mixtures thereof. Among these metal compounds, preferred are silicon oxide and/or aluminum oxide, and metal oxides containing these oxides. In particular, silicon oxide is most preferable because it can stably maintain a high gas-barrier property.

The inorganic thin film may be formed by vapor deposition method, coating method, etc., although not particularly limited thereto. Of these methods, preferred is the vapor deposition method since this method enables formation of a uniform thin film having a high gas-barrier property. Specific examples of the vapor deposition method include vacuum deposition, ion-plating, sputtering, CVD or the like. In general, the thickness of the above inorganic thin film lies in the range of 0.1 to 500 nm. In particular, in the present invention, the thickness of the inorganic thin film is adjusted to the range of usually 5 to 50 nm and preferably 10 to 30 nm in view of a good barrier stability and low costs when the thickness of the inorganic thin film is too small, it may be difficult to attain a sufficient gas-barrier property. On the other hand, when the thickness of the inorganic thin film is too large, there tend to be caused problems such as increased costs and occurrence of cracks or separation on the inorganic thin film.

In general, the harder the inorganic thin film, the higher the gas-barrier property thereof becomes. However, upon the hydrothermal treatment, owing to shrinkage of the base film and change of the inorganic thin film, the harder inorganic thin film tends to be more readily broken and deteriorated in gas-barrier property. On the contrary, in the present invention, even the hard inorganic thin film can exhibit a good gas-barrier property after subjected to the hydrothermal treatment, i.e., can exhibit a good gas-barrier property both before and after subjected to the hydrothermal treatment. Meanwhile, as the method of forming the hard inorganic thin film, there may be used the method of forming the inorganic thin film under a high vacuum in the case where the inorganic thin film is produced by a physical vapor deposition method such as vacuum deposition, ion-plating and sputtering, or the method of reducing a carbon content in the inorganic thin film in the case where the inorganic thin film is produced by a chemical vapor deposition method.

In the laminate of the present invention, the inorganic thin film before laminating the heat-sealable plastic film thereon has a rubbing strength of not less than 20 times, preferably not less than 30 times and more preferably not less than 40 times as measured under a load of 70 g. When the rubbing strength of the inorganic thin film is less than 20 times, the resultant laminate tends to suffer from delamination owing to insufficient bond between an excessive crosslinking group on the surface of the coating layer and the inorganic thin film. Meanwhile, the specific measuring method of the rubbing strength under a load of 70 g is explained hereinlater in Examples.

In order to control the rubbing strength of the inorganic thin film to the above-specified range, there may be used the method of controlling the resin components contained in the coating layer and the composition and thickness of the coating layer, the method of using the crosslinking group-containing resin in combination with the polyurethane-based resin, or the method of controlling the content of the crosslinking group-containing resin in the coating layer to 10 to 60% by weight. Among these methods, in particular, the method of using the crosslinking group-containing resin in combination with the polyurethane-based resin is more effective. Further, when producing the inorganic thin film by a physical vapor deposition method such as vacuum deposition, ion-plating and sputtering, the hard inorganic thin film can be obtained and the rubbing strength of the inorganic thin film can be enhanced by conducting the vapor deposition under a high vacuum, or by increasing the vapor deposition velocity.

The surface roughness of the inorganic thin film before laminating the heat-sealable plastic film thereon is usually not less than 1.5 nm, preferably not less than 3 nm and more preferably not less than 5 nm. When the surface roughness of the inorganic thin film is less than 1.5 nm, the interlaminar bonding property between the coating layer and the inorganic thin film upon subjected to the hydrothermal treatment tends to be insufficient. The upper limit of the surface roughness of the inorganic thin film is usually 30 nm. The surface roughness of the inorganic thin film corresponds to the surface roughness of the coating layer.

For the purpose of enhancing a gas-barrier property and a secondary processability, a coat layer may be laminated on the inorganic thin film. The coat layer may be formed by using a water-based or solvent-based resin coating agent. In addition, an inorganic material may also be added to the coat layer according to the aims thereof.

In the laminate of the present invention, the heat-sealable plastic film is laminated on the inorganic thin film or the base plastic film. The heat-sealable plastic film is not particularly limited as long as it can be subjected to hydrothermal treatment and is formed from a heat-sealable film. Examples of the preferred heat-sealable plastic film include films made of polyethylene resins, polypropylene resins, ethylene/vinyl acetate copolymer resins, ionomer resins, EAA resins, EMAA resins, EMA resins, EMMA resins, EEA resins and biodegradable resins. Among these films, preferred is an unstretched polypropylene film. The heat-sealable plastic film may be laminated on the inorganic thin film or the base plastic film by using a dry lamination method using an adhesive or an extrusion lamination method using an adhesive resin.

The laminate of the present invention may also be provided between the inorganic thin film or the base plastic film and the heat-sealable plastic film or on an outside thereof, with at least one layer such as a printed layer and the other plastic substrate and/or a paper substrate. As an ink for forming the printed layer, there may be used water-based or solvent-based resin-containing printing inks. Examples of the resin used in the printing inks include acrylic resins, urethane-based resins, polyester-based resins, vinyl chloride-based resins, vinyl acetate copolymer resins and mixtures thereof. In addition, the printing inks may also contain various known additives such as antistatic agents, light beam-shielding agents, ultraviolet light absorbers, plasticizers, slipping agents, fillers, colorants, stabilizers, lubricants, defoaming agents, crosslinking agents, anti-blocking agents and antioxidants.

The printing method for forming the printed layer is not particularly limited. Examples of the printing method include various known printing methods such as an offset printing method, a gravure printing method and a screen printing method. As the method of drying the printed layer to remove the solvent therefrom, there may be used various known drying methods such as hot-air drying, heat-roll drying and infrared drying.

As the other plastic substrate or paper substrate, there may be suitably used a substrate made of papers, polyester resins, polyamide resins or biodegradable resins from the viewpoint of attaining sufficient rigidity and strength of the resultant laminate. Further, a biaxially stretched polyester film or a biaxially stretched nylon film as a film having an excellent mechanical strength may also be laminated on the laminate of the present invention.

In particular, when the laminate of the present invention is applied to a packaging material, it is preferred that a nylon film is laminated between the inorganic thin film and the heat-sealable plastic film in order to improve mechanical properties thereof such as pinhole resistance. In general, since the nylon film undergoes remarkable heat shrinkage upon the hydrothermal treatment, there tends to arise such a problem that the inorganic thin film is broken owing to the difference in shrinkage percentage between materials of the respective layers, so that the gas-barrier property of the laminate tends to be deteriorated after retort treatment. On the contrary, the laminate of the present invention is less influenced by the above problem, thereby enabling the nylon film to be used as a constituting layer of the laminate.

Examples of the nylon may usually include nylon 6, nylon 66, m-xylene adipamide, etc. The thickness of the nylon film is usually 10 to 30 μm and preferably 15 to 25 μm. When the thickness of the nylon film is less than 10 μm, the film tends to be insufficient in strength. When the thickness of the nylon film is more than 30 μm, the film exhibits a too high nerve and is, therefore, unsuitable for processing. The nylon film is preferably in the form of a biaxially stretched film that is stretched in each of longitudinal and lateral directions at a stretch ratio of usually not less than 2 times and preferably about 2.5 to 4 times. Such a nylon film exhibits a good pinhole resistance (number of pinholes in 3,000 cycle Gelbo-Flex test at 23° C. and 50% RH: usually not more than 50 per $m^2$), as well as a good piercing strength. In addition, even nylon films having a certain heat shrinking property are also usable in the present invention, as long as a maximum shrinkage percentage thereof as measured, for example, under hydrothermal treatment conditions at 120° C. for 30 min, is usually not more than about 15% and preferably not more than about 10%. Specifically, there may be most suitably used generally used biaxailly successively stretched 6-nylon films. In addition, the use of those nylon films exhibiting a less anisotropy in shrinkage due to the hydrothermal treatment is more preferred in order to prevent deterioration in gas-barrier property of the resultant laminate.

The other plastic substrate and/or paper substrate may be laminated by any known methods such as dry lamination method and extrusion lamination method. In these methods, the substrate may be laminated by using an adhesive such as urethane-based, polyester-based and acrylic-based adhesives.

Specific examples of the layer structure of the laminate according to the present invention include (layer structure example 1): base film (for example, PET)/coating layer/inorganic thin film/adhesive layer/heat-sealable plastic film layer; (layer structure example 2): base film (for example, PET)/coating layer/inorganic thin film/adhesive layer/other plastic substrate (for example, stretched nylon film)/adhesive layer/heat-sealable plastic film layer; (layer structure example 3): base film (for example, PET)/coating layer/inorganic thin film/adhesive layer/other plastic substrate (for example, PET)/adhesive layer/other plastic substrate (for example, stretched nylon film)/adhesive layer/heat-sealable plastic film layer; (layer structure example 4): other plastic substrate (for example, PET)/adhesive layer/base film (for example, PET)/coating layer/inorganic thin film/adhesive layer/heat-sealable plastic film layer; (layer structure example 5): other plastic substrate (for example, PET)/adhesive layer/base film (for example, PET)/coating layer/inorganic thin film/adhesive layer/other plastic substrate (for example, stretched nylon film)/adhesive layer/heat-sealable plastic film layer; (layer structure example 6): other plastic substrate (for example, PET)/adhesive layer/inorganic thin film/coating layer/base film (for example, PET)/adhesive layer/heat-sealable plastic film layer; (layer structure example 7): other plastic substrate (for example, PET)/adhesive layer/inorganic thin film/coating layer/base film (for example, PET)/adhesive layer/other plastic substrate (for example, stretched nylon film)/adhesive layer/heat-sealable plastic film layer; (layer structure example 8): other plastic substrate (for example, PET)/adhesive layer/inorganic thin film/coating layer/base film (for example, stretched nylon film)/adhesive layer/heat-sealable plastic film layer; and (layer structure example 9): other plastic substrate (for example, PET)/adhesive layer/other plastic substrate (for example, PET)/adhesive layer/inorganic thin film/coating layer/base film (for example, stretched nylon film)/adhesive layer/heat-sealable plastic film layer.

More specifically, in the laminate of the present invention, as long as the layer structure of the base film/coating layer/inorganic thin film/heat-sealable plastic film layer or the layer structure of the heat-sealable plastic film layer/base film/coating layer/inorganic thin film is provided therein, one or more other layers may be formed between layers except for between the base film/coating layer/inorganic thin film and/or on an outside of the layers. Further, examples of the layer structure of the laminate having a paper layer include (layer structure example 10): other plastic substrate (for example, PP)/adhesive layer/base film (for example, PET)/coating layer/inorganic thin film/adhesive layer/paper/adhesive layer/heat-sealable plastic film layer (for example, PP); (layer structure example 11): other plastic substrate (for example, PP)/adhesive layer/paper/adhesive layer/base film (for example, PET)/coating layer/inorganic thin film/adhesive layer/heat-sealable plastic film layer (for example, PP); and (layer structure example 12): other plastic substrate (for example, PP)/adhesive layer/paper/adhesive layer/inorganic thin film/coating layer/base film (for example, PET)/adhesive layer/heat-sealable plastic film layer (for example, PP).

The total thickness of the laminate according to the present invention is usually 30 μm to 5 mm and preferably 50 μm to 3 mm, and the thickness of the laminate containing no paper is usually 50 to 500 μm. The laminate may further include a printed layer or an ultraviolet absorber-containing layer on the surface of the laminate or between the respective layers thereof in order to impart a light-shielding property or an ultraviolet-shielding property thereto. In addition, in order to prevent deterioration of contents to be packaged therein due to oxygen, a layer containing an oxygen absorber such as iron particles may also be formed on the surface of the laminate or between the respective layers thereof. The oxygen absorber-containing layer is preferably disposed between the inorganic thin film and the heat-sealable plastic film.

The laminate of the present invention before subjected to the hydrothermal treatment has an oxygen transmission rate (oxygen permeability) of usually not more than 5 cc/m$^2$/day/atm and preferably not more than 1 cc/m$^2$/day/atm. The lower limit of the oxygen transmission rate of the laminate is usually not less than 0.05 cc/m$^2$/day/atm. In particular, when the aqueous acrylic resin is used in combination with the aqueous resin containing at least one group selected from the group consisting of an oxazoline group, a melamine group, an epoxy group, an isocyanate group and a carbodiimide group and the aqueous polyurethane-based resin, the oxygen transmission rate of the resultant laminate can be reduced to not more than 1 cc/m$^2$/day/atm. The oxygen transmission rate of the laminate of the present invention after subjected to hydrothermal treatment at 120° C. for 30 min is usually not more than 3 cc/m$^2$/day/atm and preferably not more than 0.8 cc/m$^2$/day/atm. The lower limit of the oxygen transmission rate of the laminate thus subjected to the hydrothermal treatment is usually 0.05 cc/m$^2$/day/atm. The laminate of the present invention which includes the coating layer containing the crosslinking group-containing aqueous resin and the aqueous polyurethane-based resin in specific amounts, can exhibit an excellent interlaminar bonding property between the coating layer and the inorganic thin film, and further can well follow shrinkage of the base plastic film after the hydrothermal treatment since the coating layer has a specific hardness, thereby effectively preventing breakage of the inorganic thin film when subjected to the hydrothermal treatment. For this reason, the laminate of the present invention exhibits a less deterioration in oxygen transmission rate owing to the hydrothermal treatment.

EXAMPLES

The present invention is described in more detail by the following examples, but these examples are only illustrative and not intended to limit the scope of the present invention. Meanwhile, in the following descriptions, the amounts of the respective components blended are represented by "part(s) by weight" unless otherwise specified. In the following Examples and Comparative Examples, various properties were evaluated by the following methods.

(1) Measurement of Hardness of Coating Layer:

Using an extra-light load thin film hardness tester "Triboscope" manufactured by Hysitoron Inc., which was equipped with a scanning probe microscope "Nacoscope IIIa" manufactured by Digital Instruments Inc., and a Berkobich indentator, the hardness of the coating layer formed on the base plastic film before forming the inorganic thin film thereon was measured at room temperature under a relative humidity of about 50%. Upon the measurement, the indentation depth of the indentator was adjusted to about 10 nm which was 1/10 time the thickness of the coating layer, and the measurement was carefully carried out so as not to cause a drift at the starting point.

(2) Surface Roughness of Coating Layer:

Using a scanning probe microscope "SPI3800" manufactured by S.I.I. Nanotechnology Inc., the surface shape of the coating layer formed on the base plastic film before forming the inorganic thin film thereon was measured under the following conditions: DFM mode; cantilever DF 20; measured area: 2 μm square; resolution in x direction: 512 pixel; resolution in Y direction: 256 pixel. The measuring positions selected were free from surface irregularities due to the filler contained in the base plastic film. After the measurement, the surface roughness Rms of the coating layer was determined by a surface analysis software of the same apparatus.

(3) Rubbing Strength of Inorganic Thin Film:

The laminate formed on the coating layer with the inorganic thin film was attached at shorter sides thereof on a slide glass "2937WSLID-PF" produced by Iwaki Glass Co., Ltd., using a double-coated adhesive tape such that the surface of the inorganic thin film was faced upward, thereby preparing a sample to be measured. A cotton swab "HUBY340" (for industrial use) was fitted to a reciprocating abrasion tester "30S Model" manufactured by Shinto Kagaku Co., Ltd., so as to extend in the direction perpendicular to the inorganic thin film, and reciprocatively scanned 20 times under a load of 70 g at a scanning velocity of 1200 mm/min and a scanning distance of 25 mm. The mid point of the scanning distance was observed by a differential interference optical microscope (magnification: 200 times). The results of the observation was evaluated according to the following ratings.

A: The peeled-off surface area of the inorganic thin film was less than 10% relative to the angle of visibility.

B: The peeled-off surface area of the inorganic thin film was not less than 10% relative to the angle of visibility.

(4) Surface Roughness of Inorganic Thin Film:

Under the same conditions as used for measuring the surface roughness of the coating layer, the surface shape of the inorganic thin film was measured to determine the surface roughness Rms thereof.

(5) Softening Temperature of Coating Layer:

The measurement was conducted using a micro-thermal analyzer "μ-TA Device" manufactured by T. A. Instruments Inc. This apparatus was equipped with a sensor having a detecting portion made of a wire folded into a V-shape at a tip end thereof. Upon the measurement, a sample prepared by forming a coating layer on a base plastic film was tested while bringing the V-shaped detecting portion of the sensor into contact with a surface of the coating layer and heating the sample from room temperature at a temperature rise rate of 10° C./min under an indentation force of 20 nA. When the sensor was moved downward, it was determined that the coating layer was softened, and the softening initiation temperature of the coating layer was measured.

(7) Gas-Barrier Property (Oxygen Transmission Rate):

The measurement of oxygen transmission rate was conducted using a laminate as a sample 1 and the laminate after subjected to hydrothermal treatment at 120° C. for 30 min in an autoclave as a sample 2. The oxygen transmission rates (cc/m$^2$·24 hr·atm) of the samples 1 and 2 were measured at a temperature of 25° C. and a relative humidity of 80% using an oxygen transmission rate measuring apparatus "OX-TRAN100 Model" manufactured by Modern Control Corp.

Coating Material A Containing Aqueous Polyurethane-based Resin (Carboxyl Group-Containing Polycarbonate-Based Polyurethane):

After adding 7.0 parts of trimethylol propane and 57.0 parts of 1,4-butanediol to 255 parts of polyhexamethylene carbonate polyol (molecular weight: 2000), 290 parts of methyl ethyl ketone was added to the resultant mixture to dissolve the mixture therein. Next, 260 parts of isophorone diisocyanate and 0.01 part of dibutyl tin laurate were added to the obtained solution to react with each other at 75° C. for 180 min, thereby obtaining an urethane prepolymer containing a liberated isocyanate group.

Next, after adding 26.5 parts of dimethylolpropionic acid and 120 parts of methyl ethyl ketone to the resultant prepolymer, the obtained mixture was mixed with 0.07 part of dibutyl tin laurate and further with 9.9 parts of triethylamine to react with each other at 75° C. for 120 min, thereby obtaining an urethane prepolymer containing a liberated isocyanate group and a carboxyl group. Next, 9.9 parts of triethylamine was added to the thus obtained urethane prepolymer at 50° C. to neutralize a residual carboxyl group in the prepolymer. Thereafter, while gradually adding 900 parts of distilled water, the reaction solution was subjected to emulsification procedure at 25° C. for 20 min using a homomixer. Then, using an evaporator, methyl ethyl ketone was recovered under reduced pressure from the reaction solution, thereby obtaining a coating material A containing an aqueous polyurethane-based resin.

Coating Material B Containing Aqueous Polyurethane-based Resin (Polyether-Based Polyurethane):

A reaction vessel was charged with 59.2 parts by weight of polytetramethylene glycol (molecular weight: 1000), 10.3 parts by weight of polyoxyethylene-propylene random copolymer glycol (molecular weight: 3000), 1.2 parts by weight of 1,4-butanediol, 1.5 parts by weight of trimethylol propane and 0.001 part by weight of dibutyl tin laurate, and then 67 parts by weight of methyl ethyl ketone was added to the reaction vessel to dissolve the contents of the reaction vessel therein. Next, 27.8 parts by weight of isophorone diisocyanate was added to the resultant solution to react with each other at 75° C. for 150 min, thereby obtaining an urethane prepolymer containing a liberated isocyanate group.

Next, the thus obtained urethane prepolymer was mixed with 26.5 parts of dimethylolpropionic acid and 120 parts of methyl ethyl ketone and then with 0.07 part of dibutyl tin laurate and further 9.9 parts of triethylamine to react with each other at 75° C. for 120 min, thereby obtaining an urethane prepolymer containing a liberated isocyanate group and a carboxyl group. Next, the thus obtained urethane prepolymer was additionally mixed with 9.9 parts of triethylamine at 50° C. to neutralize a residual carboxyl group in the prepolymer. Thereafter, while gradually adding 900 parts of distilled water, the reaction solution was subjected to emulsification procedure at 25° C. for 20 min using a homomixer. Then, using an evaporator, methyl ethyl ketone was recovered under reduced pressure from the reaction solution, thereby obtaining a coating material B containing an aqueous polyurethane-based resin.

Coating Material C Containing Aqueous Polyurethane-based Resin (Polyester-based Polyurethane):

A mixture of 294 parts of terephthalic acid, 294 parts of isophthalic acid, 131 parts of ethylene glycol and 223 parts of diethylene glycol was heated at a temperature of 180 to 230° C. for 8 hr to conduct an esterification reaction therebetween. Thereafter, the obtained reaction solution was subjected to condensation reaction at 230° C. for 6 hr until the acid value thereof was reduced to less than 1. Next, the resultant reaction solution was subjected to dehydration treatment under reduced pressure at 120° C., and then cooled to 90° C. Thereafter, the obtained reaction product was mixed with 263 parts of methyl ethyl ketone and fully dissolved therein, thereby obtaining a polyester polyol having an acid value of 0.7 and a hydroxyl value of 50. 226 parts of the thus obtained polyester polyol was fully stirred with 44 parts of isophorone diisocyanate at 75° C., and then 13 parts of 2,2-dimethylolpropionic acid was added thereto to react with each other at 70° C. for 12 hr.

After completion of the reaction, the obtained reaction solution was cooled to 40° C., and then 35 parts of 5% ammonia aqueous solution was added thereto to render the solution water-soluble. Next, methyl ethyl ketone was removed from the resultant transparent reaction product under reduced pressure at 60° C., and then ion-exchanged water was added to the reaction product to suitably control a concentration thereof, thereby obtaining a translucent coating material D containing an aqueous polyurethane-based resin. As a result, it was confirmed that the thus obtained coating material D containing the aqueous polyurethane-based resin had a non-volatile content of 22.5% and a solid acid value of 19.

Coating Material D1 Containing Aqueous Oxazoline Group-containing Resin:

"EPOCROS WS-500" produced by Nippon Shokubai Co., Ltd., was used.

Coating Material D2 Containing Aqueous Epoxy Group-containing Resin:

Diglycerol diglycidyl ether produced by Nagase Chemtecs Co., Ltd., was used.

Coating Material D3 Containing Aqueous Melamine Group-containing Resin:

"MX-035" (methylolated melamine) produced by Sanwa Chemical Co., Ltd., was used.

Coating Material D4 Containing Aqueous Isocyanate Group-containing Resin:

"AQUANATE AQ-100" produced by Nippon Polyurethane Co., Ltd., was used.

Coating Material D5 Containing Aqueous Carbodiimide Group-containing Resin:

"CARBODILITE E-02" produced by Nissin Boseki Co., Ltd., was used.

Coating Material E Containing Aqueous Acrylic Resin (Aqueous Solution of Carboxyl Group-containing Acrylic Resin):

600 parts of isopropyl alcohol was heated to 80° C. in a nitrogen gas flow while stirring, and then a monomer mixed solution previously prepared by mixing 36 parts of acrylic acid, 300 parts of methyl methacrylate, 132 parts of butyl methacrylate, 132 parts of butyl acrylate and 12 parts of azobisisobutyronitrile was dropped into the isobutyl alcohol at 80° C. over 3 hr. After completion of the dropping, the obtained reaction solution was allowed to stand at 80° C. for 2 hr, and then 1.2 parts of azobisisobutyronitrile was added to the reaction solution, followed by further allowing the solution to stand for 2 hr to continue the reaction thereof under stirring.

After completion of the reaction, the obtained reaction solution was cooled to 40° C., and mixed with 46 parts of dimethylethanolamine and then with 600 parts of ion-exchanged water to render the solution water-soluble. Next, the resultant transparent reaction product was subjected to distillation at 60° C. under reduced pressure to distil off isopropyl alcohol therefrom, and then ion-exchanged water was added to the reaction product to suitably control a concentration thereof, thereby obtaining a translucent water-soluble acrylic resin. As a result, it was confirmed that the thus obtained water-soluble acrylic resin had a non-volatile content of 32.1% and a solid acid value of 47.

Coating Material F Containing Aqueous Acrylic Resin (Acrylic Resin Emulsion):

A reactor was charged with 400 parts of water, 30 parts of a 20% aqueous solution of "Polyethylene Glycol 20,000" produced by Wako Junyaku Kogyo Co., Ltd., 1 part of a 20% aqueous solution of lauryltrimethyl ammonium chloride "Coatamine 24P" produced by Kao Corp., and 1 part of a 5% aqueous solution of 2,2'-azobis(2-amidinopropane)dichloride "V-50" produced by Wako Junyaku Kogyo Co., Ltd., and after a gas phase portion of the reactor was purged with a nitrogen gas for 15 min, the contents of the reactor were heated to 65° C. Next, 40 parts of water and 1 part of a 20% aqueous solution of "Coatamine 24P" as additional components were added to the reactor, and then a monomer component composed of 51 parts of ethyl alcohol, 45 parts of styrene, 2 parts of glycidyl acrylate and 2 parts of N-(3-dimethylaminopropyl)acrylamide was continuously added to the reactor over 3 hr to subject the contents of the reactor to emulsion polymerization at 70° C. After completion of the addition, the obtained reaction solution was further aged at a temperature of 75 to 80° C. for 2 hr, and then cooled to 25° C. Next, after adjusting a solid concentration of the reaction solution to 20% by adding water thereto, the reaction solution was filtered through a 200-mesh wire screen, thereby obtaining a coating material F containing an aqueous acrylic resin. As a result, it was confirmed that the polymer particles contained in the thus obtained aqueous dispersion had an average particle size of 100 nm, and the copolymer produced from the monomer components used had a glass transition temperature of 24° C.

Examples 1 to 4 and Comparative Examples 1 to 4

Nylon 6 "NOVAMIDE 1020CA" produced by Mitsubishi Chemical Corporation, was extruded into a sheet shape from an extruder at 280° C., and cast on a cooling drum while contacting therewith by a static adhesion method, thereby obtaining an amorphous nylon sheet having a thickness of about 150 μm. The thus obtained nylon sheet was stretched at 50° C. at a stretch ratio of 3 times in a longitudinal direction thereof. Then, respective aqueous coating solutions each having a composition as shown in Tables 1 to 3 were applied onto one surface of the film obtained after the longitudinal stretching. The thus obtained coated sheet was stretched at 90° C. at a stretch ratio of 3.5 times in a lateral direction thereof, and then heat-treated at 215° C., thereby obtaining a biaxially stretched nylon 6 film composed of the coating layer having a thickness of 0.1 μm and the base nylon 6 film having a thickness of 15 μm. As a result, it was confirmed that the thus obtained film had a hydrothermal shrinkage percentage of 3% in a longitudinal direction thereof and 6% in a lateral direction thereof as measured after subjected to hydrothermal treatment at 127° C. for 5 min in an autoclave. Further, the obtained film was subjected to measurements to determine a hardness, a surface roughness and a softening temperature of the coating layer formed therein.

Next, SiO was vaporized by a high-frequency heating method using a vacuum vapor deposition apparatus under a vacuum of $6\times10^{-6}$ Torr and deposited on the surface of the above film on which the coating layer was formed, thereby obtaining an inorganic thin film-deposited film including a silicon oxide thin film having a thickness of about 30 nm. The thus obtained deposited film was subjected to measurements to determine a rubbing strength, a surface roughness and a bonding property of the silicon oxide then film deposited thereon.

Next, an urethane-based adhesive (mixture containing adhesives "AD-900" and "CAT-RT85" both produced by Toyo Morton Co., Ltd., at a blending ratio of 10:1.5) was applied onto a 12 μm-thick biaxially stretched polyester film "H100C" produced by Mitsubishi Polyester Film Corporation, and then dried, thereby forming an adhesive resin layer having a thickness of about 4 μm on the polyester film. The above-prepared inorganic thin film-deposited film was laminated onto the thus obtained adhesive resin layer such that the inorganic thin film was faced to the adhesive resin layer. Next, the urethane-based adhesive was also applied onto the base nylon 6 film of the inorganic thin film-deposited film thus laminated on the polyester film, and then dried, thereby forming an adhesive resin layer having a thickness of about 4 μm. Onto the thus formed adhesive resin layer was laminated a 50 μm-thick heat-sealable unstretched polypropylene film "TOREFAN NO ZK-93K" produced by Toray Synthetic Film Co., Ltd., thereby obtaining a transparent laminate having a layer structure composed of biaxially stretched polyester film/adhesive layer/inorganic thin film/coating layer/base nylon 6 film/adhesive layer/unstretched polypropylene film. The thus obtained laminate was subjected to hydrothermal treatment in an autoclave at 120° C. for 30 min to measure oxygen transmission rates thereof before and after the hydrothermal treatment. The results are shown in Tables 1 to 3.

Example 5

The same procedure as defined in Example 2 was conducted except that upon forming the inorganic thin film, aluminum was vaporized and deposited at a vacuum of $1\times10^{-4}$ Torr while feeding an oxygen gas using a gas flow rate controller to form an aluminum oxide thin film having a thickness of about 30 nm, thereby obtaining a transparent laminate. The thus obtained laminated was subjected to hydrothermal treatment to measure oxygen transmission rates thereof before and after the hydrothermal treatment. The results are shown in Table 1.

Examples 10 and 11

Polyethylene terephthalate containing a regenerated polyethylene terephthalate in an amount of 50% by weight and having an intrinsic viscosity of 0.62 was extruded from a mouthpiece of an extruder at a temperature of 280 to 300° C., and cast on a cooling drum while contacting therewith by a static adhesion method, thereby obtaining an amorphous polyester sheet having a thickness of about 150 μm. The thus obtained sheet was stretched at 95° C. at a stretch ratio of 3.5 times in a longitudinal direction thereof. Then, respective aqueous coating solutions containing components as shown in Tables 1 and 2 in which resins forming the coating layer were blended at the mixing ratio as shown in Table 2, were applied onto one surface of the film obtained after the longitudinal stretching. The thus obtained coated film was stretched at 110° C. at a stretch ratio of 3.5 times in a lateral direction thereof, and then heat-treated at 230° C., thereby obtaining a biaxially stretched polyester film composed of the coating layer having a thickness of 0.1 μm and the base polyester film having a thickness of 12 μm. The thus obtained film was subjected to measurements to determine a hardness, a surface roughness and a softening temperature of the coating layer formed therein.

Next, SiO was vaporized by a high-frequency heating method using a vacuum vapor deposition apparatus under a vacuum of $6\times10^{-6}$ Torr and deposited on the surface of the above film on which the coating layer was formed, thereby obtaining an inorganic thin film-deposited film including a silicon oxide thin film having a thickness of about 30 nm. The thus obtained deposited film was subjected to measurements to determine a rubbing strength, a surface roughness and a bonding property of the silicon oxide thin film deposited thereon.

Next, an urethane-based adhesive (mixture containing adhesives "AD-900" and "CAT-RT85" both produced by Toyo Morton Co., Ltd., at a blending ratio of 10:1.5) was applied onto the silicon oxide thin film deposited on the resultant film, and then dried, thereby forming an adhesive resin layer having a thickness of 4 μm. Onto the thus formed adhesive resin layer was laminated a 50 μm-thick heat-sealable unstretched polypropylene film "TOREFAN NO ZK-93K" produced by Toray Synthetic Film Co., Ltd., thereby obtaining a transparent laminate having a 5-layer structure composed of base polyester film/coating layer/inorganic thin film/adhesive layer/unstretched polypropylene film. The thus obtained laminate was subjected to hydrothermal treatment in an autoclave at 120° C. for 30 min to measure oxygen transmission rates thereof before and after the hydrothermal treatment. The results are shown in Table 2.

Comparative Example 5

The same procedure as defined in Example 2 was conducted except that the nylon 6 film having the coating layer before depositing the silicon oxide thin film thereon was heat-treated in a 100° C. oven for 3 days, thereby obtaining a transparent laminate. The thus obtained laminate was subjected to hydrothermal treatment to measure oxygen transmission rates thereof before and after the hydrothermal treatment. The results are shown in Table 3.

TABLE 1

| | Examples | | | | | |
|---|---|---|---|---|---|---|
| | 1 | 2 | 3 | 4 | 5 | 6 |
| Blending ratio for coating layer | | | | | | |
| Coating material A containing aqueous polyurethane-based resin (polycarbonate-based polyurethane) | 50 | 40 | 20 | 20 | 40 | 55 |
| Coating material D1 containing aqueous oxazoline group-containing resin | 50 | 30 | 60 | 20 | 30 | — |
| Coating material D2 containing aqueous epoxy group-containing resin | — | — | — | — | — | 25 |
| Coating material D3 containing aqueous melamine group-containing resin | — | — | — | — | — | — |
| Coating material D4 containing aqueous isocyanate group-containing resin | — | — | — | — | — | — |
| Coating material D5 containing aqueous carbodiimide group-containing resin | — | — | — | — | — | — |
| Coating material E containing aqueous acrylic resin (aqueous solution of carboxyl group-containing acrylic resin) | — | 30 | 20 | 60 | 30 | 20 |
| Hardness of coating layer (GPa) | 0.21 | 0.25 | 0.30 | 0.37 | 0.25 | 0.25 |
| Surface roughness of coating layer (nm) | 16.3 | 8.0 | 5.0 | 1.8 | 8.0 | 9.2 |
| Rubbing strength of inorganic thin film | A | A | A | A | A | A |
| Surface roughness of inorganic thin film (nm) | 18.0 | 9.8 | 6.3 | 2.5 | 9.4 | 10.0 |
| Oxygen transmission rate (cc/m²/day/atm) | | | | | | |
| Before hydrothermal treatment | 0.8 | 0.5 | 0.5 | 0.5 | 0.9 | 1.3 |
| After hydrothermal treatment | 2.5 | 0.5 | 0.3 | 0.9 | 0.9 | 2.4 |

TABLE 2

| | Examples | | | | |
|---|---|---|---|---|---|
| | 7 | 8 | 9 | 10 | 11 |
| Blending ratio for coating layer | | | | | |
| Coating material A containing aqueous polyurethane-based resin (polycarbonate-based polyurethane) | 40 | 55 | 40 | 50 | 40 |
| Coating material D1 containing aqueous oxazoline group-containing resin | — | — | — | 50 | 30 |
| Coating material D2 containing aqueous epoxy group-containing resin | — | — | — | — | — |
| Coating material D3 containing aqueous melamine group-containing resin | 30 | — | — | — | — |
| Coating material D4 containing aqueous isocyanate group-containing resin | — | 25 | — | — | — |
| Coating material D5 containing aqueous carbodiimide group-containing resin | — | — | 30 | — | — |
| Coating material E containing aqueous acrylic resin (aqueous solution of carboxyl group-containing acrylic resin) | 30 | 20 | 30 | — | 30 |
| Hardness of coating layer (GPa) | 0.23 | 0.28 | 0.25 | 0.22 | 0.25 |
| Surface roughness of coating layer (nm) | 8.5 | 9.0 | 7.5 | 15.8 | 7.0 |
| Rubbing strength of inorganic thin film | A | A | A | A | A |
| Surface roughness of inorganic thin film (nm) | 9.5 | 10.2 | 8.6 | 16.5 | 8.1 |
| Oxygen transmission rate (cc/m²/day/atm) | | | | | |
| Before hydrothermal treatment | 1.1 | 1.0 | 0.8 | 0.8 | 0.4 |
| After hydrothermal treatment | 1.3 | 1.6 | 0.9 | 2.3 | 0.5 |

TABLE 3

| | Comparative Examples | | | | |
|---|---|---|---|---|---|
| | 1 | 2 | 3 | 4 | 5 |
| Blending ratio for coating layer | | | | | |
| Coating material A containing aqueous polyurethane-based resin (polycarbonate-based polyurethane) | — | 50 | — | 40 | 40 |
| Coating material B containing aqueous polyurethane-based resin (polyether-based polyurethane) | — | — | 40 | — | — |
| Coating material D1 containing aqueous oxazoline group-containing resin | 50 | — | 30 | 30 | 30 |
| Coating material E containing aqueous acrylic resin (aqueous solution of carboxyl group-containing acrylic resin) | 50 | 50 | 30 | — | 30 |

TABLE 3-continued

|  | Comparative Examples | | | | |
| --- | --- | --- | --- | --- | --- |
|  | 1 | 2 | 3 | 4 | 5 |
| Coating material F containing aqueous acrylic resin (acrylic resin emulsion) | — | — | — | 30 | — |
| Hardness of coating layer (GPa) | 0.42 | 0.16 | 0.18 | 0.27 | 0.45 |
| Surface roughness of coating layer (nm) | 3.0 | 12.0 | 1.3 | 9.4 | 9.1 |
| Rubbing strength of inorganic thin film (nm) | B | B | B | B | B |
| Surface roughness of inorganic thin film (nm) | 5.1 | 13.2 | 1.8 | 11.2 | 10.3 |
| Oxygen transmission rate ($cc/m^2/day/atm$) | | | | | |
| Before hydrothermal treatment | 2.0 | 3.5 | 0.8 | 0.9 | 1.2 |
| After hydrothermal treatment | 80 | >100 | 14 | 18 | 30 |

Although the present invention is described above with respect to embodiments which are considered to be most practical and preferable at the present time, the present invention is not limited to these embodiments described in the present specification, and various changes and modifications will be appropriately made within the scope of claims and a whole description of the present specification unless departing from the subject matter and concept of the present invention, and it should be construed that these changes and modifications are involved in the technical scope of the present invention.

The invention claimed is:

1. A gas-barrier laminate for hydrothermal treatment, comprising a base plastic film, a coating layer formed on at least one surface of the base plastic film, an inorganic thin film formed on a surface of the coating layer which is made of a metal compound and/or silicon compound, and a heat-sealable plastic film laminated on the inorganic thin film or the base plastic film, wherein
  the coating layer comprises
  a crosslinking aqueous resin comprising at least one group selected from the group consisting of a melamine group and a carbodiimide group,
  an aqueous polyurethane-based resin which is the reaction product of a polycarbonate-based polyhydroxy compound and a polyisocyanate compound, and
  an aqueous acrylic resin;
  the amount of the crosslinking aqueous resin is 10 to 60% by weight of the coating layer in terms of a solid content thereof; and
  the inorganic thin film before laminating the heat-sealable plastic film thereon has a rubbing strength of not less than 20 times as measured under a load of 70 g, and the coating layer has a hardness of 0.15 to 0.40 GPa.

2. The gas-barrier laminate according to claim 1, wherein the base plastic film is made of a plastic material selected from the group consisting of polyesters, polyamides, polypropylene, polyvinyl acetate and partially hydrolyzed products of ethylene-vinyl acetate copolymers.

3. The gas-barrier laminate according to claim 1, wherein the aqueous acrylic resin is a water-soluble acrylic resin.

4. The gas-barrier laminate according to claim 1, wherein the metal compound and/or silicon compound is silicon oxide and/or aluminum oxide, or a metal oxide containing these oxides.

5. The gas-barrier laminate according to claim 1, wherein the inorganic thin film has a thickness of 5 to 50 nm.

6. The gas-barrier laminate according to claim 1, wherein the inorganic thin film has a surface roughness Rms of not less than 1.5 nm.

7. The gas-barrier laminate according to claim 1, wherein the heat-sealable plastic film is laminated on the inorganic thin film.

8. The gas-barrier laminate according to claim 7, further comprising an adhesive layer formed between the inorganic thin film and the heat-sealable plastic film.

9. The gas-barrier laminate according to claim 1, wherein the heat-sealable plastic film formed on the inorganic thin film or the base plastic film is an unstretched polypropylene film having a thickness of 50 μm, and a gas-barrier laminate after subjected to hydrothermal treatment at 120° C. for 30 min has an oxygen transmission rate of not more than 5 $cc/m^2/day/atm$.

10. A gas-barrier laminate for hydrothermal treatment, comprising a base plastic film, a coating layer formed on at least one surface of the base plastic film, an inorganic thin film formed on a surface of the coating layer which is made of a metal compound and/or silicon compound, and a heat-sealable plastic film laminated on the inorganic thin film or the base plastic film, wherein
  the coating layer comprises
  a crosslinking aqueous resin comprising at least one group selected from the group consisting of an oxazoline group and a carbodiimide group,
  an aqueous polyurethane-based resin which is the reaction product of a polycarbonate-based polyhydroxy compound and a polyisocyanate compound, and
  a water-soluble acrylic resin;
  the inorganic thin film before laminating the heat-sealable plastic film thereon has a rubbing strength of not less than 20 times as measured under a load of 70 g, and
  the coating layer has a hardness of 0.25 to 0.30 GPa.

* * * * *